Patented Oct. 1, 1935

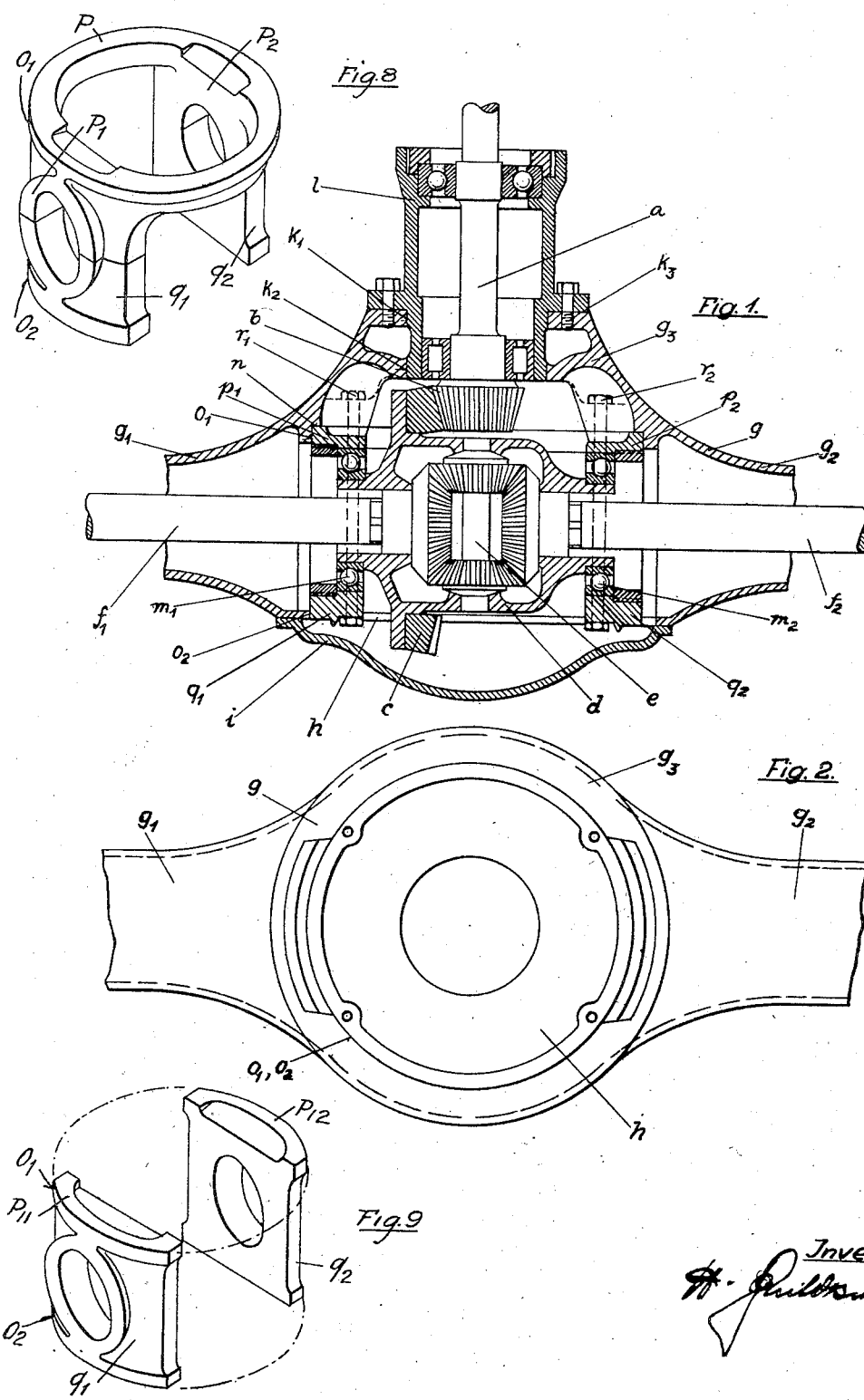

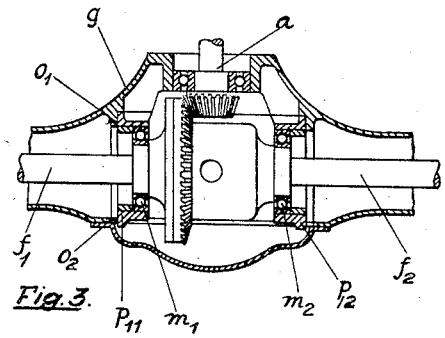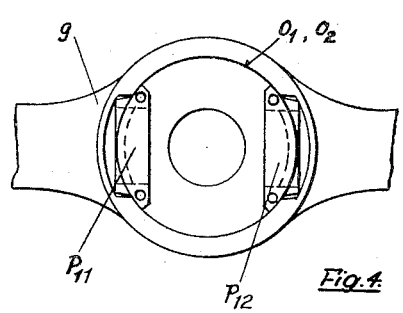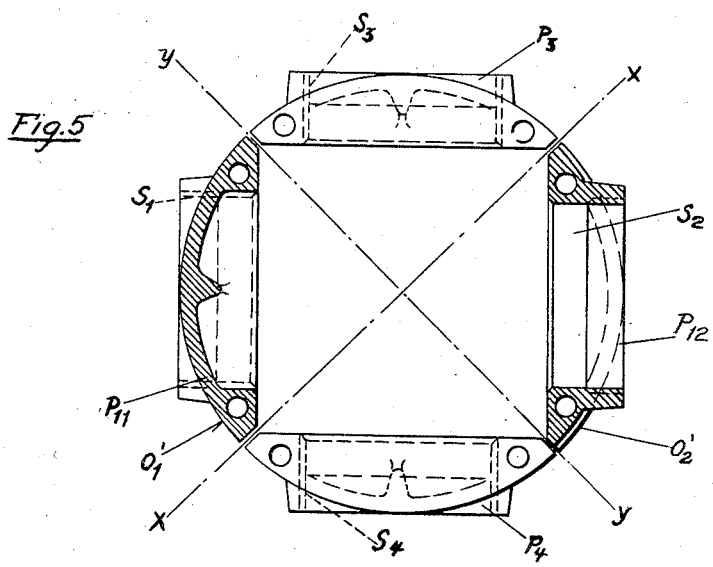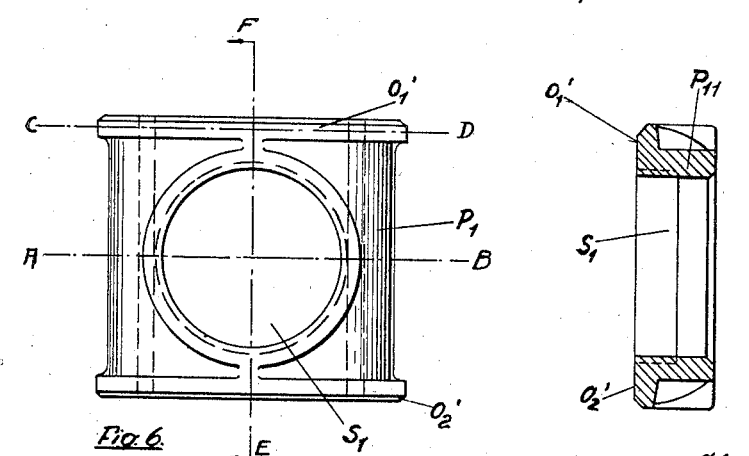

2,015,969

UNITED STATES PATENT OFFICE 2,015,969

REAR AXLE GEAR CASING

Heinrich Schildknecht, Gaggenau, Germany, assignor to Daimler-Benz Aktiengesellschaft, Stuttgart-Unterturkheim, Germany, a German company Application April 5, 1933, Serial No. 664,625
In Germany March 26, 1932

12 Claims. (Cl. 74—607)

This invention relates to rear axle gearing, more particularly for power driven vehicles, with bearing carriers for the cross-shafts mounted in the rear axle gear casing and consists substantially in this, that the bearing carriers bear substantially symmetrically to the cross-shafts in the axial direction against the axle tubes of the casing, more particularly in such a manner that the axial thrust acting on the bearing carriers in the direction of the cross-shafts is transmitted directly to the axle tubes, without subjecting the bearing carriers and the casing to bending stresses.

Furthermore, the invention consists in this, that the bearing carriers for the two cross-shafts are mounted in the axle casing as a common ring-shaped body or as portions thereof and are jointly centered therein about an axis perpendicular to the cross-shafts, for instance about the axis of the driving shaft. This results in the first place in an extremely simple mode of manufacture of the casing and of the bearing carriers, as for instance all the essential fitting surfaces serving for the mounting of the gearing including the bearing carriers can be tooled in a single operation from the central axis of the gearing. At the same time the assemblage becomes simple and the cross-shafts are journalled in a manner ensuring the noiseless running of the gearing.

Constructional examples of the invention are illustrated in the accompanying drawings, in which Fig. 1 is a horizontal section through the differential casing of the rear axle, Fig. 2 a view of the empty casing from behind, with the casing cover removed.

Figs. 3 to 7 show a further constructional example, in which the bearing supports each form only quarter ring pieces. Figs. 3 and 4 show the diagrammatic arrangement corresponding to Figs. 1 and 2, Figs. 5 to 7 the single bearing carrier, Fig. 5 being a plan view partly in section of four bearing carriers showing how the four carriers are made from a single ring member which is subsequently divided up, the left-hand carrier being in section on the line C—D of Fig. 6 and the right-hand carrier in section on the line A—B of Fig. 6, while Fig. 6 is an end view of a bearing carrier and Fig. 7 a section on the line E—F of Fig. 6.

Fig. 8 is a perspective view of the bearing carriers shown in Fig. 1 and

Fig. 9 is a perspective view of the bearing carriers shown in Figs. 3 and 4.

In Figs. 1 and 2 of the drawings $a$ is the driving shaft which drives through the pinion $b$, the crown wheel $c$, the differential body $d$ and the differential gearing $e$ on to the cross-shafts $f_1$ and $f_2$. The gearing wheels and the cross-shafts are enclosed in the known manner in the axle casing $g$ which consists of the middle casing part $g_3$ surrounding the gearing and of the two lateral axle tubes $g_1$ and $g_2$. The gearing parts are mounted in the casing $g_3$ in such a manner that the surfaces to be tooled can be operated on from the axis of the driving shaft in a single operation. With this object in view the casing is provided with an opening $h$ which can be closed by the cover $i$. For supporting the driving shaft $a$ a tubular casing extension $l$ is provided, which is centred at $k_1$ and $k_2$, while the cross-shafts or the differential body $d$ are supported by means of ball bearings $m_1$ and $m_2$ in a ring piece $p$ having bearing carriers $p_1$, $p_2$ with bearing covers $q_1$, $q_2$, which ring piece bears against the collar $n$ and is centred at $o_1$. The bearing covers may be mounted removably on the bearing carriers $p_1$, $p_2$, the bearings being divided for instance in a plane perpendicular to the axis of the driving shaft and containing the axes of the shafts $f_1$ and $f_2$, and the bearing covers can be fixed for instance by screws $r_1$ and $r_2$ respectively to the bearing carriers $p_1$, $p_2$ and at the same time to the casing $g_3$.

The bearing carriers $p_1$, $p_2$ might be made in two parts, so that for each bearing body $p_1$, $q_1$ and $p_2$, $q_2$ there are separate ring halves or parts centered at $o_1$. The bearing carriers $p_1$, $p_2$ or the bearing covers $q_1$ $q_2$ might also be additionally centered in the opening $h$ at $o_2$, so that the axial thrusts occurring in the gearing will not subject the axle casing to bending stresses but only to compression or tension stresses and will transmit the forces directly through the centering surface $o_1$ and $o_2$ to the axle tubes $g_1$ and $g_2$ respectively. The centering means $k_1$, $k_2$, $o_1$ and $o_2$ are all coaxial. Furthermore the plane surfaces disposed perpendicularly to this axis, for instance $k_3$ and $n$, can also be tooled from this axis.

In Figs. 3 to 7 and 9 an axle casing is shown, the bearing carriers of which are particularly convenient to manufacture, the arrangement being such that the said carriers can be tooled in a single operation as quarter parts of a continuous ring piece and can thereupon be separated from one another by cutting open the ring.

The reference letters are substantially the same as in the constructional example shown in Figs. 1 and 2 with the exception that in this case the bearing carriers and bearing covers $p_1$, $q_1$ and $p_2$, $q_2$ of the first example are each in the form of bearing bodies $P_{11}$ and $P_{12}$ each consisting of a single piece. Fig. 5 shows the arrangement of the ring piece, the centering surfaces $o_1$ and $o_2$ and the bearing bores, $s_1$, $s_2$, $s_3$ and $s_4$ of which are tooled at a single operation, and which is divided by two cuts $x$—$x$ and $y$—$y$ at 90° to one another into the four separate bearings or bearing carriers $P_{11}$, $P_{12}$, $P_3$ and $P_4$. The bearing carrier $P_{11}$ is shown in section on line C—D, and the opposite bearing carrier $P_{12}$ in section on line A—B of Fig. 6. Fig. 7 shows a section on line E—F of Fig. 6.

Any two of the individual bearing carriers can be used for one rear axle casing, so that from one ring piece the bearings for two rear axle assemblies are obtained. Preferably two opposed bearing carriers will be employed for one rear axle casing, as they can be bored in a single operation, thus eliminating inaccuracies in the registering of the bores.

What I claim is:

1. In a rear axle casing with a central axle gearing and two cross-shafts, a centering surface in the casing, concentric with an axis perpendicular to the cross-shafts, and a separate bearing carrier for each of the two cross-shafts disposed adjacent to the axle gearing, the two bearing carriers forming parts of a ring body having a turning surface for centering in the said centering surface, as and for the purpose set forth.

2. In a rear axle casing with a central axle gearing and two cross-shafts, two centering surfaces which are substantially symmetrical with respect to the cross-shafts and disposed about a centering axis perpendicular to the cross-shafts, a separate bearing carrier each containing the bearing bore for the cross-shaft associated therewith, turning surfaces corresponding to the centering surfaces at one end of the said bearing carrier on either side of the said bearing bore, the two bearing carriers being centered on the same centering surfaces by means of the turning surfaces associated with them, as and for the purpose set forth.

3. In a rear axle casing with a central axle gearing and two cross-shafts, a centering surface concentric with a centering axis perpendicular to the cross-shafts, a bearing carrier for each of the said cross-shafts, a turning surface on each bearing carrier corresponding to the centering surface, each bearing carrier forming a substantially integral fraction of a complete ring-shaped body and being jointly centered on the said centering surface, as and for the purpose set forth.

4. In a rear axle casing with a central axle gearing and two cross-shafts, a centering surface concentric with a centering axis perpendicular to the cross-shafts, a bearing carrier for each of the said cross-shafts, a turning surface on each bearing carrier corresponding to the centering surface, each bearing carrier forming substantially the fourth part of a complete ring-shaped body and being centered together with the other bearing carrier on the said centering surface, as and for the purpose set forth.

5. In a rear axle casing for enclosing the rear axle gearing and having tubes for the cross-shafts, a cylindrical centering surface in the casing concentric with an axis perpendicular to the cross-shafts and bearing carriers for the cross-shafts mounted in the casing and jointly centered on said cylindrical centering surface.

6. In a rear axle casing having tubes for the cross-shafts and a circular rear opening for the insertion into and removal of central axle gearing means from the rear axle casing, a cylindrical centering surface in the casing concentric with said circular rear opening and with an axis perpendicular to the cross-shafts and bearing carriers for the cross-shafts mounted in the casing and jointly centered on said cylindrical centering surface.

7. In a rear axle casing for enclosing the rear axle gearing and having tubes for the cross-shafts, a pair of centering surfaces in the casing, said centering surfaces comprising substantially symmetrical sections of a cylindrical surface concentric with an axis perpendicular to the cross-shafts and bearing carriers for the cross-shafts mounted in the casing and jointly centered on said centering surfaces.

8. In a rear axle casing for enclosing the rear axle gearing and having tubes for the cross-shafts, a cylindrical centering surface in the casing concentric with an axis perpendicular to the cross-shafts and bearing carriers for the cross-shafts mounted in the casing and jointly centered on said cylindrical centering surface, the rear axle casing having also an abutment surface perpendicular to the axis of the centering surface against which the bearing carriers rest in the direction of the centering axis.

9. In a rear axle casing for enclosing the rear axle gearing and having tubes for the cross-shafts, a cylindrical centering surface in the casing concentric with an axis perpendicular to the cross-shafts, bearing carriers for the cross-shafts in the casing and jointly centered on said cylindrical centering surface, the rear axle casing having also an abutment surface perpendicular to the axis of the centering surface, and screws for fixing the bearing carriers inside the casing, said screws extending parallel to the centering axis and holding the bearing carriers against the said abutment surface.

10. In a rear axle casing with a central axle gearing and cross-shafts, bearing carriers for the cross-shafts mounted in the casing, said bearing carriers forming a closed common centered ring-shaped body, and a centering surface in the casing concentric with a centering axis perpendicular to the cross-shafts, on which centering surface the bearing carriers are jointly centered.

11. In a rear axle casing with a central axle gearing and cross-shafts, a centering surface in the casing concentric with a centering axis perpendicular to the cross-shafts and bearing carriers for the cross-shafts mounted in the casing, said bearing carriers being divided in a plane extending perpendicular to the centering axis and substantially through the cross-shafts, one part of one bearing carrier forming with the corresponding part of the other bearing carrier a closed common centered ring-shaped body, on each of which the other part of the bearing carrier which acts as a bearing cover is fixed removably, said bearing carriers being jointly centred on the said centering surface.

12. In a gear casing, two bearing carriers for two shafts having a common axis, a cylindrical surface formed in the casing concentric with an axis perpendicular to the said shafts for centering the bearing carriers and turned surfaces on the bearing carriers corresponding to the said centering surface by which the bearing carriers are centered on the centering surface in the casing.

HEINRICH SCHILDKNECHT.